United States Patent
Demi et al.

(10) Patent No.: US 7,272,241 B2
(45) Date of Patent: Sep. 18, 2007

(54) METHOD AND APPARATUS FOR CONTOUR TRACKING OF AN IMAGE THROUGH A CLASS OF NON LINEAR FILTERS

(75) Inventors: Marcello Demi, Montescudaio (IT); Marco Paterni, Pontedera (IT); Antonio Benassi, Ghezzano San Giuliano Terme (IT); Vincenzo Gemignani, Torre del Lago (IT)

(73) Assignees: Consiglio Nazionale Delle Ricerche, Rome (IT); Esaote S.p.A., Firenze FL (IT)

( * ) Notice: Subject to any disclaimer, the term of this patent is extended or adjusted under 35 U.S.C. 154(b) by 809 days.

(21) Appl. No.: 10/665,102

(22) Filed: Sep. 18, 2003

(65) Prior Publication Data
US 2004/0096106 A1 May 20, 2004

(30) Foreign Application Priority Data
Sep. 18, 2002 (IT) .......................... PI2002A0051

(51) Int. Cl.
*G06K 9/00* (2006.01)
*G06K 9/48* (2006.01)
(52) U.S. Cl. .................. 382/103; 382/199; 348/169
(58) Field of Classification Search ................ 382/103, 382/199, 266; 348/169–172
See application file for complete search history.

(56) References Cited

U.S. PATENT DOCUMENTS

| 6,611,609 | B1 * | 8/2003 | Zhu ........................... 382/103 |
| 6,888,564 | B2 * | 5/2005 | Caviedes et al. ........... 348/180 |
| 2002/0104891 | A1 * | 8/2002 | Otto ........................... 235/494 |
| 2005/0074140 | A1 * | 4/2005 | Grasso et al. ............... 382/103 |
| 2006/0064016 | A1 * | 3/2006 | Demi et al. ................. 600/450 |

OTHER PUBLICATIONS

Paterni M et al: "A Real Time Contour Tracking System to Investigate the Cross-Sectional Area Changes of the Aorta": Computers in Cardiology 2000 Camgridge MA, USA; Sep. 24-27, 2000, Piscataway, NJ, USA, Sep. 24, 2000; pp. 599-602; ISBN: 0-7803-6557-7.

(Continued)

*Primary Examiner*—Bhavesh M Mehta
*Assistant Examiner*—Aaron W Carter
(74) *Attorney, Agent, or Firm*—The Bilicki Law Firm, PC

(57) ABSTRACT

A method for automatically detecting and tracking the contour of an image that uses a class of filters, obtained from the first order absolute central moment. The method provides the steps of filtering a starting image through the absolute central moment e(n,m) of the intensity of a pixel of the image, being n and m the coordinates of each pixel, where the absolute central moment is obtained with the following steps: determining for each n,m the local mean calculated in a neighborhood about a pixel of coordinates n,m of the starting image, thus obtaining a first filtered image; determining for each n,m the sum of the absolute differences between the intensity of a pixel of coordinates n,m of the first filtered image and the intensity of all the pixels contained in a neighborhood about a pixel of coordinates n,m of either the starting image or a second filtered image obtained from the starting image.

15 Claims, 6 Drawing Sheets

OTHER PUBLICATIONS

Paterni M. et al: "Countour Tracking over Images Sequences": Computers in Cardiology, 1996, Indianapolis, IN, USA Sep. 8-11, 1996, New York, NY, USA, Sep. 8, 1996, pp. 421-424; ISBN: 0-7803-3710-7.

Paterni M et al: "The Frst Order Absolute Moment in Contour Tracking": Computers in Cardiology 1997; Lund, Sweden; Sep. 7-10, 1997, New York, NY, USA; Sep. 7, 1997, pp. 545-548; ISBN: 0-7803-4445-6.

Demi M et al: "The First Order Absolute Moment in Low-Level Image Processing"; Digital Signal Processing Proceedings, 1997, DSP 97., 1997 13th International Conference on Santorini, Greece: Jul. 2-4, 1997; New York, NY, USA; Jul. 2, 1997; pp. 511-514; ISBN: 0-7803-4137-6.

Paterni M et al: "How the Map of Mass Centers of the Frst Order Absolute Moment Can be Used to Track Contours in Image Sequences": Computers in Cardiology 1998 Cleveland, OH, USA; Sep. 13-16, 1998, New York, NY, USA; pp. 505-508; ISBN 0-7803-5200-9.

Gemignani V et al: "A DSP-Based Real Time Contour Tracking System" Image Analysis and Processing, 1999. Proceedings. International Conference on Venice, Italy: Sep. 27-29, 1999, Los Alamitos, CA, USA, Comput. Soc, US, Sep. 27, 1999; pp. 630-635; ISBN 0-7695-0040-4.

* cited by examiner

4a

4d

4b

4e

4c

4f

5a

5b

5c

6a

6b

6c

6d

6e

6f

6g

7a

7b

7c

7d

METHOD AND APPARATUS FOR CONTOUR TRACKING OF AN IMAGE THROUGH A CLASS OF NON LINEAR FILTERS

FIELD OF THE INVENTION

The present invention relates to a method for detecting and tracking the contour of structures present in an image.

Furthermore, the invention relates to an electronic arrangement where non linear filters are resident which can be applied inside contour detecting and tracking procedures.

The images to treat can be of various type and coming from many fields, among which robotics, control of industrial processes, medicine, multimedia applications, safety systems, and can be color or grey levels images.

In case of applications in medicine, i.e. in biomedical imaging, they refer normally to an organ and are obtained with various techniques such as ultrasonic pulses, PET, SPECT, CAT, MR, etc., which can be anatomical images, or images of function, obtained by means of time sequences of anatomical views of a particular zone of the organ, or images of perfusion, obtained on the same organ after treatment of the patient with substances that highlight the perfusion in the organ. Or, the images can be graphs (ex. ECG) acquired by a scanner, thus allowing to a paper graph to be converted into a digital signal.

Moreover, bidimensional images may turn into volumetric images or panoramic images if acquired as slices of spatial sequences.

Contour tracking is a relevant aspect of image control procedures, since it is frequently used in the above fields. A contour, defined as a quick variation of intensity and/or color between two adjacent regions, can be tracked following different approaches among which the most frequently used are based on first and second order derivative filters.

First Order Derivative Filters

First order derivative filters measure the variation of the light intensity in a predetermined area of interest. Any discontinuities in this case are detected searching for local maxima of the output of a derivative filter.

One of the most used filter is the gradient of Gaussian (GoG), whose output is satisfactory on straight contours without crossings with other contours, but tends to loose efficiency in the presence of contours with high aperture (i.e. at bends), at the end of lines or on bars, as well at crossings with other discontinuities and in isolated points (spots). In the presence of noise the use of a predetermined threshold allows to discriminate any spurious local maxima from local maxima due to discontinuity. Many procedures use a single and predetermined threshold value on all the image. This type of approach is however not much effective since the features of the image (brightness, contrast, noise etc.) are not, normally, constant on the whole area. For example, the darkest parts of an image are often derived from variation of intensity less than from brighter areas. Then, a threshold value suitable for bright zones cannot be suitable for darker zones and vice versa. These problems have brought to the development of prior art procedures capable of tracking locally the threshold values that better fit to a specific area of the image, associating to each pixel of the image a threshold owing to the brightness variation. In particular:

U.S. Pat. No. 6,094,508 uses a determined threshold through a model that approximates and measures the output of the human sight to the variation of local intensity;

EP0414505 uses a dynamic threshold determined by an error estimation of the diffusion in a neighborhood about each point of the image.

U.S. Pat. No. 6,061,476 uses an approach in which, through a subtraction technique, a threshold is sought that is proportional to the contrast between the background and the feature to track.

U.S. Pat. No. 4,220,972 solves the problem of tracking contours from images with low contrast, using a threshold proportional to the local brightness of the image.

Derivative Filters of the Second Order

Derivative filters of the second order output a zero-crossing at the contour of structures present in the images. This zero-crossing is due to the fact that the contours are defined as discontinuities, at which the intensity of the output meets the value zero.

The most common derivative filter than the second order is the Laplacian of Gaussian (LoG), widely used in computer vision applications. It is often approximated by a Difference of two Gaussian curves (DoG) having different aperture. In this case the detection of the contours is based on searching zero-crossing points of the output of the derivative filter. This operation is not easy, especially in the presence of noise, because the second order derivation enhances the noise.

Also in this case, the noise is approached using a step of thresholding, for example as in U.S. Pat. No. 5,086,219, adopting a threshold according to the strength of the zero crossing, i.e. to the slope of the curved point at the zero crossing; the reason is that, normally, to the discontinuity correspond more intense zero-crossings (i.e. zero crossings with much higher slopes) than those elsewhere typical of the noise, which in this way can be filtered.

Alternatively, U.S. Pat. No. 5,142,592 describes a procedure based on the LoG filter for detection of close contours and parallel to each other; in this case, parallelism is a condition exploited for reducing the problems deriving from the presence of noise.

Normally, the derivative filters of first and second order give a poor output at angles, edges, vertices, intersections, variation of aperture, etc., and this causes, in addition to a not completely satisfactory result, also an heavier computational load.

SUMMARY OF THE INVENTION

It is a feature of the present invention to provide a method for detecting and tracking contours of an image that allows to obtain an image with detail normally higher than that obtained with the methods of prior art.

It is another a feature of the present invention to provide a method for detecting and tracking contours of an image for a highlighting with very good resolution key points of the image, such as angles, edges, vertices, intersections, variation of aperture, lines, isolated points, etc.

It is a further a feature of the present invention to provide a method for detecting and tracking contours of an image that carries out computing steps in a quicker way than the systems of prior art.

It is a particular a feature of the present invention to provide a method for detecting and tracking contours for distinguishing an inner edge from an outer edge of the contours of the image.

It is also a feature of the present invention to introduce a new a class of filters, which can be used in this method for detecting and tracking contours.

The invention will now summarized with reference to grey levels mapping of an image, being it clear that it can be extended also to color images. In particular, the word intensity is intended to define either the intensity of grey levels pixels, or of color pixels.

According to the invention, the above described objects are achieved by a method for automatically detecting and tracking the contour of an image that uses a class of filters, obtained from the first order absolute central moment.

The method provides the step of filtering a starting image through the absolute central moment e(n,m) of the intensity of the pixels of said image, being n and m the coordinates of each pixel, where the absolute central moment is obtained with the following steps:

determining for each n,m the local mean calculated on a neighborhood about a pixel of coordinates n,m of the starting image, obtaining a first filtered image;

determining for each n,m the sum of the absolute differences between the intensity of a pixel of coordinates n,m of the first filtered image and the intensity of all the pixels contained in a neighborhood about the pixel of coordinates n,m of either said starting image or a second filtered image obtained from said starting image.

Preferably, the sum of absolute differences is calculated computing the differences between the first filtered image and a second filtered image, derived from the starting image, obtained for each n,m from a local mean calculated on a neighborhood about a pixel of coordinates n,m of the starting image.

Advantageously, the sum of absolute differences is split calculating a sum of positive differences, or positive deviation, and a sum of negative differences, or negative deviation.

According to the invention, the computing operation of the absolute generalized central moment of the grey levels of a pixel of an image comprises the steps of:

defining four circular domains $\Theta_1$, $\Theta_2$, $\Theta_3$ and $\Theta_4$, respectively of radius $r_1$, $r_2$, $r_3$ and $r_4$;

associating to each domain $\Theta_i$ a weight function $w_i$;

computing a mean weighed value $\mu_i$ of the grey levels map for domains $\Theta_1$ and $\Theta_2$;

computing the absolute generalized central moment e(n, m) with a weight function $w_3$ on domain $\Theta_3$;

splitting the absolute generalized central moment e(n,m) into two complementary filters: a positive deviation $e_p(n,m)$ and a negative deviation $e_n(n,m)$ that produce, near a discontinuity, two partially overlapping bell-shaped profiles;

convoluting the two positive $e_p(n,m)$ and negative $e_n(n,m)$ deviations with a weight function $w_4$ on domain $\Theta_4$;

One of the main advantages of the invention is that $e_n(n,m)$ produces a bell curve with a peak on a dark edge of the discontinuity whereas $e_p(n,m)$ produces a bell curve with a peak on a bright edge thereof. Normally, then, the negative deviation enhances dark structures on bright background, whereas the positive deviation enhances bright structures on dark background. Furthermore, one of the two deviations enhances the inner edge of a structure whereas the other deviation enhances the outer edge thereof. This can be useful for example to distinguish, once defined, an outer edge from an inner edge of a blood vessel, of a cardiac wall, etc.

Another main advantage is that a function $\text{Min}(e_p(n,m), |e_n(n,m)|)$ allows to overcome a computational difficulty of searching a "zero-crossing" of the output of the filter. The overlapping zone of the two components represents in fact a very sharp edge that detects directly a "zero-crossing", and then a discontinuity, creating at the same time a value proportional to the slope of a "zero-crossing". This computational simplification makes the method advantageous for tracking contours of video images arranged as succession of photograms.

Another main advantage is that two standard filters often used in computer vision as the DoG (difference of Gaussian curves) and the GoG (gradient of Gaussian curve) can be replaced the first with the sum the two deviations positive $e_p(n,m)+e_n(n,m)$ and the second with the difference $e_p(n,m)-e_n(n,m)$. This because the results are similar.

Another main advantage is that the absolute central moment e(n,m) produces a bell-shaped profile at discontinuities and produces local maxima at edges, at junctions as well as at end points of lines. Then, the performances of the absolute central moment are better than the gradient of Gaussian in the key points of the image.

Another main advantage is that the absolute central moment e(n,m) produces a bell-shaped profile also at lines and can then can be used for tracking graphs (per example electrocardiograms) on paper allowing to convert them into digital signals. The paper graphs can be scanned and the image obtained can be filtered using the absolute central moment e(n,m) in order to showing the electrocardiogram by a bell-shaped profile. The peak of this bell-shaped profile is the sought digital signal and can be measured with a detection algorithm of standard type of the local maxima.

Another main advantage is that two filtering operations obtained with the absolute central moment e(n,m) using different parameters $r_1$, $r_2$, $r_3$ and $r_4$ can be used for implementing an algorithm of local thresholding that compares two images, one with higher noise and lower intensity in the peaks and one with lower noise and higher intensity in the peaks.

Advantageously, the weight functions are selected from the group:

constant functions, where the value of the constant is chosen in order to normalize the target function on domain $\Theta_i$;

Gaussian functions, wherein weight functions $w_i$ are approximated with functions normalized on circular domains $\Theta_i$ of radius $r_i=3_i$.

According to another aspect of the invention, an apparatus for tracking the contour of an image comprises at least two filters and an Arithmetic Logic Unit (ALU), wherein said filters compute the positive deviation $e_p(n,m)$ and of the negative deviation $e_n(n,m)$ of the absolute central moment e(n,m), as above defined.

In particular, each filter is characterized by a predetermined set of parameters consisting of the coefficients of the weight functions. Such coefficients can be chosen in a start-up phase of the system. Typically, the weight functions and the image involve the same number of bits. The ALU carries arithmetic and logic operations on the results of the previous filters according to a chosen filtering operation.

BRIEF DESCRIPTION OF THE DRAWINGS

Further characteristics and advantages of the methods according to the present invention will be made clearer by the following description, exemplifying but not limitative, with reference to the attached drawings wherein.

DESCRIPTION OF THE METHOD

The method according to the invention starts from a generalization of the first order absolute central moment.

Whereas:

f (n,m) is a map of the grey levels of an image, where f assumes one among 256 grey levels values between 0 and 255 for each pixel of coordinates n, m, $w_1$(n,m), $w_2$(n,m), $w_3$(n,m) and $w_4$(n,m) are four weight functions defined on four circular domains $\Theta_1$, $\Theta_2$, $\Theta_3$ and $\Theta_4$, each point of the domains having coordinates (k,l), and the domains being chosen according to special criteria as defined below.

$r_1$, $r_2$, $r_3$ and $r_4$ are each a respective radius of $\Theta_1$, $\Theta_2$, $\Theta_3$ and $\Theta_4$, the absolute generalized central moment of the first order is calculated as follows:

$$e(n,m) = w_4(n,m) \otimes \sum\sum_{(k,l)\in\Theta_3} |\mu_1(n,m) - \mu_2(n-k, m-l)| w_3(k,l) \quad (1)$$

where $\otimes$ is a convolution operator, the mean value $\mu_i$(n,m) is calculated as:

$$\mu_i(n,m) = \sum\sum_{(k,l)\in\Theta_i} f(n-k, m-l) w_i(k,l) \quad (2)$$

domains $\Theta_i$ are defined as:

$$\Theta_i = \{(k,l)\in I^2 : \sqrt{k^2+l^2} \leq r_i\} \quad (3)$$

where i is a generic whole number.

Figure 1:
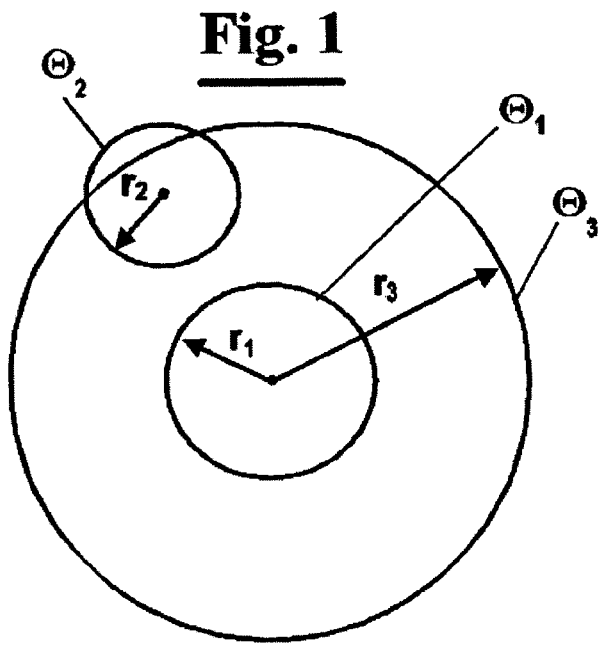
FIG. 1 is a graphic representation of the domains $\Theta_1$, $\Theta_2$ and $\Theta_3$ used when computing the first order absolute central moment at a pixel of the image.

With reference to FIG. 1, the first absolute generalized central moment measures the variability of the mean value of the grey levels contained in circular domain $\Theta_3$ with respect to the local mean value of the grey levels calculated in central domain $\Theta_1$; the mean value of the grey levels of each point of circular domain $\Theta_3$ is calculated in a circular domain $\Theta_2$.

Concerning the weight functions, they can be:

a constant weight function, chosen in order to normalize the function on domain $\Theta_1$ in the following way $$w_i(k,l) = \begin{cases} C & (k,l) \in \Theta_i \\ 0 & (k,l) \notin \Theta_i \end{cases} \quad (4)$$

where $\sum\sum_{(k,l)\in\Theta_i} w_i(k,l) = 1 \quad (5)$

A Gaussian weight function, approximated with functions normalized on circular domains $\Theta_i$ of radius $r_i = 3\sigma_i$, calculated as follows:

$$w_i(k,l) = \begin{cases} \dfrac{e^{-\frac{(k^2+l^2)}{2\sigma_i^2}}}{\sum\sum_{(k,l)\in\Theta_i} e^{-\frac{(k^2+l^2)}{2\sigma_i^2}}} & (k,l) \in \Theta_i \\ 0 & (k,l) \notin \Theta_i \end{cases} \quad (6)$$

The absolute generalized central moment e(n,m) is then split into two complementary filters: a positive deviation $e_p$(n,m) and a negative deviation $e_n$(n,m), and precisely:

$$e_p(n,m) = w_4(n,m) \otimes \sum\sum_{(k,l)\in\Theta_{3p}} (\mu_1(n,m) - \mu_2(n-k, m-l)) w_3(k,l) \quad (7)$$

$$e_n(n,m) = w_4(n,m) \otimes \sum\sum_{(k,l)\in\Theta_{3n}} (\mu_1(n,m) - \mu_2(n-k, m-l)) w_3(k,l)$$

where the domains $\Theta_{3p}$ and $\Theta_{3n}$ are defined as:

$\Theta_{3p} = \{(k,l)\in\Theta_3 : \mu_1(n,m) > \mu_2(n-k,m-l)\}$ $\Theta_{3n} = \{(k,l)\in\Theta_3 : \mu_1(n,m) < \mu_2(n-k,m-l)\} \quad (8)$ The absolute generalized central moment can then be obtained as:

$$e(n,m) = e_p(n,m) - e_n(n,m) \quad (9)$$

Figure 2:
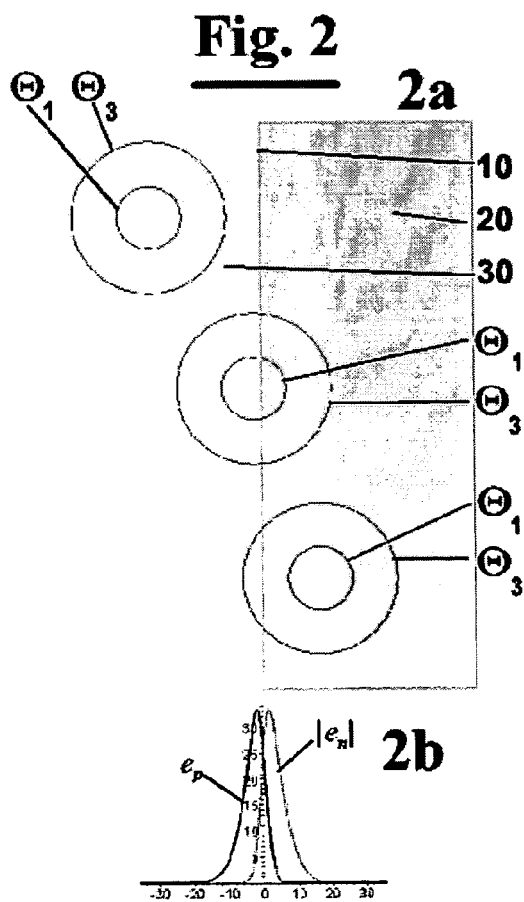
FIG. 2 shows the output (2b) of two components $e_p$(n,m) and $e_n$(n,m) of the first absolute central moment near a discontinuity occurred at step (2a)

FIG. 2 shows the output (2b) of $e_n$(n,m) and $e_p$(n,m) to a test image (2a) with an ideal step-like discontinuity 10 between two zones with different grey levels 20 and 30. At the discontinuity 10, $e_n$(n,m) and $e_p$(n,m) give two partially overlapping bell-shaped profiles. On one hand $e_n$(n,m) produces a bell curve with a peak on a dark edge of the discontinuity, on another hand $e_p$(n,m) produces a bell curve with a peak on a bright edge thereof. Normally the negative deviation enhances dark structures on bright background, whereas the positive deviation enhances bright structures on dark background.

Figure 3:
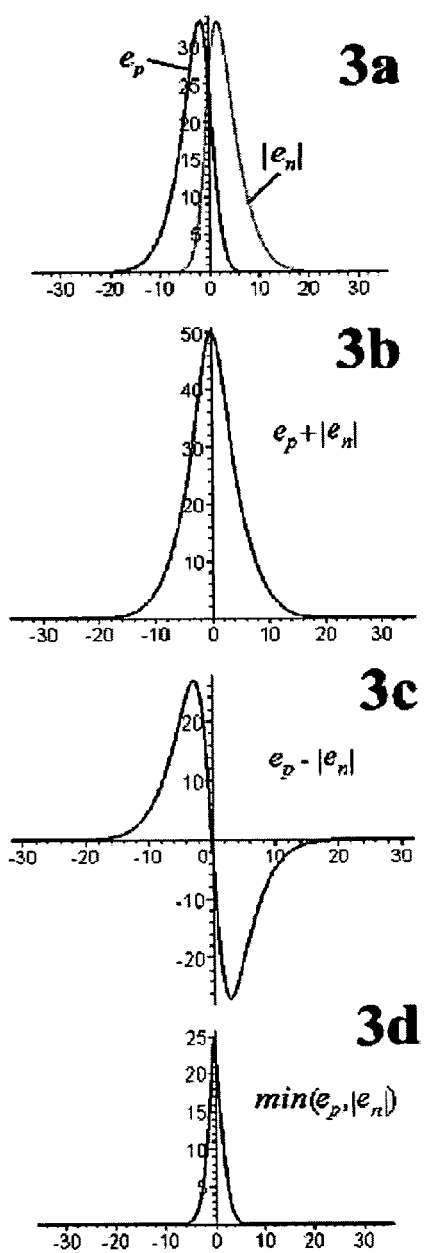
FIG. 3 shows how the output (3a) of $e_p$(n,m) and $e_n$(n,m) can be combined to obtain different outputs (3b-3d)

FIG. 3 shows diagrammatically as the outputs of filters $e_p$(n,m) and $e_n$(n,m) can be combined to obtain different discontinuity outputs.

FIG. 3a: single components $e_p(n,m)$ and $|e_n(n,m)|$ are shown as separate bell-shaped curves.

FIG. 3b: the sum of the positive and negative components $e_p(n,m)+|e_n(n,m)|$ gives a single bell-shaped profile whose peak defines the discontinuity. This output is very similar to that obtainable with a gradient of Gaussian.

FIG. 3c: the difference of the positive and negative components $e_p(n,m)-|e_n(n,m)|$, instead, produces a output similar to that obtainable with a Laplacian of Gaussian filter. The filter produces in fact a zero-crossing at the discontinuity.

FIG. 3d: a computational difficulty of searching the zero-crossing of the output of the filter is overcome with function $\text{Min}(e_p(n,m), |e_n(n,m)|)$. The overlapping zone of the two components represents in fact a very sharp edge that detects the zero-crossing, and then the discontinuity, creating at the same time a value proportional to the slope of the zero-crossing.

Generation of Local Maxima at the Discontinuity

Figure 4:
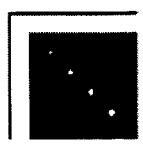
FIG. 4 shows, in case of two starting images (4a and 4d), the output of the central moment (4c and 4f) in the combination of FIG. 3b, compared with the output of the gradient of Gaussian (4b and 4e)
Figure 4:
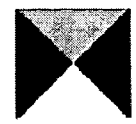
Figure 4:
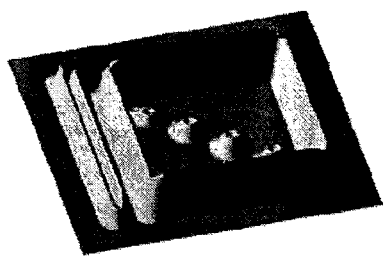
Figure 4:
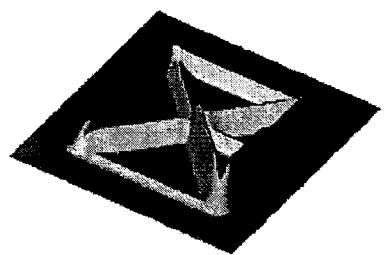
Figure 4:
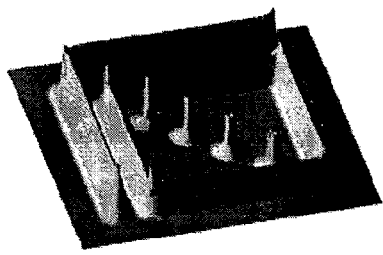
Figure 4:
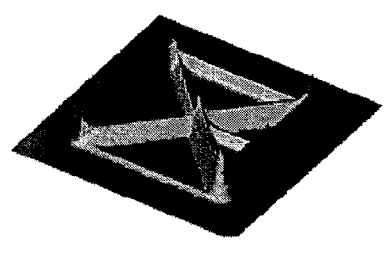

With the sum $e_p(n,m)+|e_n(n,m)|$ the function $e(n,m)$ is obtained, which produces a value zero in homogeneous regions and local maxima at discontinuities. The absolute central moment is a dispersion index that produces a map similar to that of the gradient of Gaussian. FIG. 4 shows how, starting from two images (4a and 4d) linear combination $e_p(n,m)+|e_n(n,m)|$ generates (4c and 4f) a peak at the discontinuity. It is however relevant to observe that, differently from the gradient of Gaussian (4b and 4e), the absolute central moment defines a bell-shaped profile both at lines and at step-like discontinuities, and it defines local maxima at edges, junctions and end points of lines. Then, the performances of the absolute central moment are better than the gradient of Gaussian in key points of the image.

In the case of Gaussian weight functions, the output of the absolute central moment is different as the size varies of the domains $\Theta_1$, $\Theta_2$, $\Theta_3$. In particular the absolute generalized central moment, if respectively:

$\sigma_1 < \sigma_2 < \sigma_3$—produces a single bell-shaped profile at the discontinuity;

$\sigma_1 < \sigma_2 < 1/2\sigma_3$ produces local maxima at the edges;

$\sigma_1 \leq \sigma_2 \leq 2/3\sigma_3$; $6\sigma_2 \geq d$; $\sigma_3 \geq d$—produces a lines bell curve of amplitude d.

By introducing weight function $w_1(n,m)$ the operator is not shown all the junctions with local maxima. On the other hand weight function $w_1(n,m)$ is necessary for filtering the noise normally present in the images and cannot be eliminated. For showing all the junctions with local maxima the two positive $e_p(n,m)$ and negative $e_n(n,m)$ deviations must be kept separate from each other since they provide local maxima at all the junctions.

It must be noted that the first order central moment in its standard form is always zero. However, the present operator is a generalization of the first order central moment and is not always zero. First order central moment:

$$c(n,m) = w_4(n,m) \otimes \sum\sum_{(k,l)\in\Theta_3} (\mu_1(n,m) - \mu_2(n-k, m-l))w_3(k,l) \quad (10)$$

is equivalent to eq. (1) without absolute value condition and this way it can be obtained as sum of the two negative and positive components of eq(1). Developing eq. (10) the following results:

$$c(n,m) = e_p(n,m) + e_n(n,m) \quad (11)$$
$$= f(n,m) \otimes (w_1(n,m) \otimes w_4(n,m) - w_2(n,m) \otimes w_3(n,m) \otimes w_4(n,m))$$
$$= f(n,m) \otimes (w_a(n,m) - w_b(n,m))$$

Eq.(11) shows how in case of Gaussian weight functions the sum $e_p(n,m)+e_n(n,m)$ provides a output equivalent to that supplied by a DoG filter (difference of Gaussian curves).

Map and Intensity of the Zero-Crossing

Hereinafter a filter is indicated obtained by an easy algorithm to map and estimate the intensity at the zero-crossing.

The absolute central moment can be split into the positive and negative components, and four weight functions can be put in the original filters. In case of Gaussian weight functions, the sum of the output of the two positive and negative components is equivalent to the output of a DoG filter, independently from the apertures $\sigma_1$, $\sigma_2$, $\sigma_3$, $\sigma_4$. However, in the zero crossing of the two components of the DoG output, the two ridges generated by the negative and positive deviations of the absolute moment overlap partially. The profile of the overlapping area is a thin ridge whose peak defines the discontinuity. The height of a peak, furthermore, is proportional to the discontinuity contrast value. Then an easy algebraic function, such as the function Min(positive deviation, |negative deviation|), can provide at the same time both a map Mpn, which is similar to the map of the zero-crossing obtained with the method of Marr-Hildreth (FIG. 3), and an estimation of the intensity of the zero-crossing.

Figure 5:
FIG. 5 shows, in case of four starting images (5a) the output of the filter Min(positive deviation, |negative deviation|) (5c) in the combination of FIG. 3d, compared to the map of zero-crossing obtained as output to a Difference of two Gaussian curves (DoG) (5b)
Figure 5:
Figure 5:

In FIG. 5 four images (5a) are shown, of which the first is a diagrammatic image with Gaussian noise and the other three are generic images. Then, the charts are compared of the zero-crossing, obtained from the application on one hand (5b) of a DoG filter (method of Marr-Hildreth), and on the other hand (5c) of the procedure according to the invention Min(positive deviation, |negative deviation|); the latter shows contours similar to those of the zero-crossing charts. In the example the low-pass filters are set in the same way for both the approaches. the classic apertures have been used $\sigma_2=1.6\sigma_1\sigma_3=0$ of a DoG filter. A Gaussian $w_4(n, m)$ with opening $\sigma_4=0.7$ pixels has been finally used to cause the two deviations of the absolute moment to overlap. If this configuration is used the two deviations are the same as the two positive and negative components of the output of a DoG filter when they are filtered separately with a Gassian having a same 0.7 pixels aperture.

Procedure of Local Thresholding

A procedure of local thresholding can be obtained combining two charts generated through the following filters:

$$e'(n,m) = \sum\sum_{(k,l)\in\Theta_3} |\mu_1(n,m) - f(n-k, m-l)|w_3(k,l) \quad (12)$$

$$e''(n,m) = w_4(n,m) \otimes \sum\sum_{(k,l)\in\Theta_3} |f(n,m) - f(n-k, m-l)|w_3(k,l) \quad (13)$$

In the presence of noise, when $r_1=r_4$, on homogeneous zones of the image eq. (12) produces less noise than eq. (13). At the discontinuity, instead, the result is opposite. At the discontinuity eq. (12) produces bell-shaped profiles higher than those of eq. (13). Since eq. (12) produces local maxima that are higher at discontinuities and lower noise at homogeneous zones with respect to eq. (13), the latter can be used as threshold of the output obtained with eq. (12).

Figure 6:
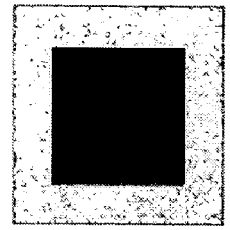
FIG. 6 shows a procedure of local thresholding according to the invention in many steps thereof, 6a-6g.
Figure 6:
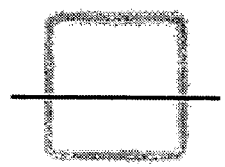
Figure 6:
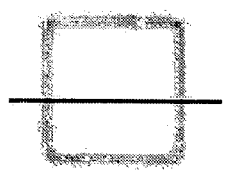
Figure 6:
Figure 6:
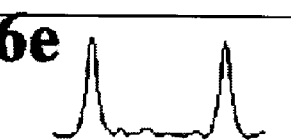
Figure 6:
Figure 6:
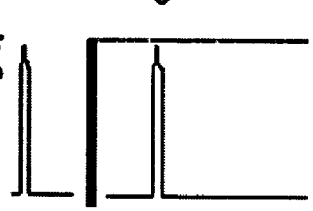

With reference to FIG. 6, then, starting from a test image 6a, to which has been summed Gaussian noise, the filters are applied of eq. (12) and eq. (13), obtaining respectively the images 6b and 6c; the graphs 6d and 6e show the profile of the grey levels obtained respectively from images 6b and 6c at the rows there represented; by thresholding the image of graph 6d with the curves of graph 6e, profile 6g is obtained; in the latter the elimination of the noise is apparent, as resulting from the procedure of local thresholding.

Figure 7:
FIGS. 7a to 7d show a typical application of the procedure of local thresholding, starting from the same images of FIG. 5.
Figure 7:
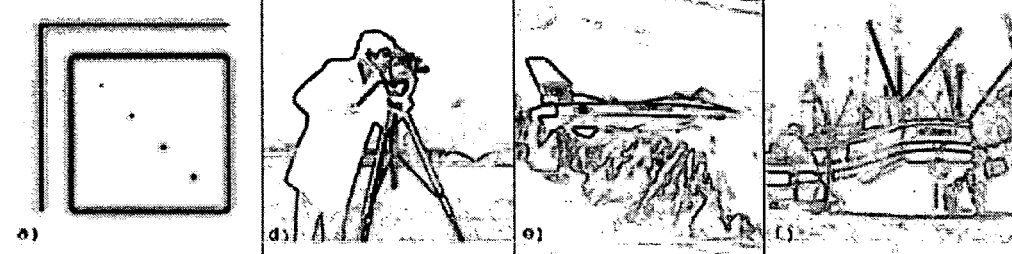
Figure 7:
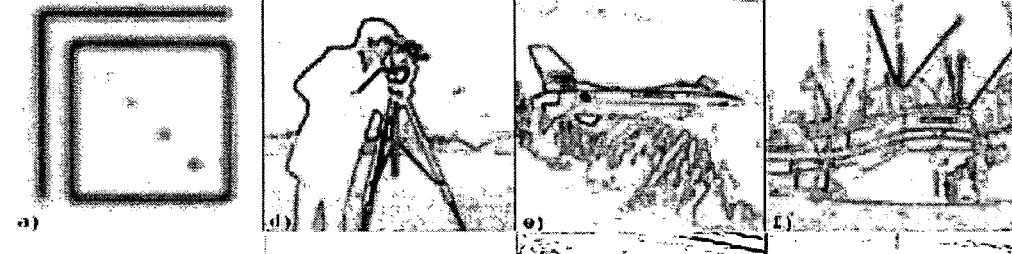
Figure 7:
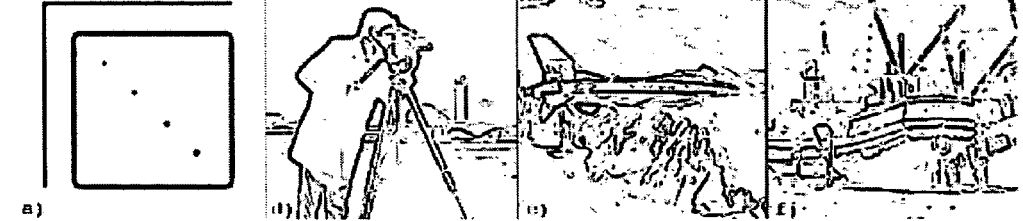

As shown in FIG. 7, using a local thresholding procedure with images of row 7a, the same of FIG. 5a, by filtering them with eq. (10), the images are obtained of row 7b, and filtering them with eq. (11) the images are obtained of row 7c, and thresholding the images of row 7b with the images of row 7c the images of row 7d are eventually obtained.

From the above comes that the filters according to the invention, obtained from a generalization of the first order absolute central moment, even if they have functionalities similar to some filters frequently used (gradient of Gaussian, Laplacian of Gaussian, difference of Gaussian curves, etc.), are advantageous because in a single filter the following features are concentrated:

- by adjusting the parameters of the first order absolute central moment the filters resulting therefrom can provide the same results of traditional filters such as gradient of Gaussian, Laplacian of Gaussian and difference of Gaussian curves,
- both first and second order derivative filters can be implemented,
- at the same time the detection of the zero-crossing of the second order derivatives and an estimation of their intensity can be obtained,
- they can be used for implementation of an algorithm of local thresholding,
- it is possible to show separately the inner edge and the outer edge of a a structure, or also separately dark objects on bright background and bright objects on dark background,
- it is possible to show, by means of local maxima, key points of the image such as edges, junctions and end points of lines, as well as isolated points,
- it is possible to show with a ridge the central line of a plurality of lines having thickness not zero, as well as they can be used for tracking graphs (for example ECG) previously printed on paper,
- as well as they can be used, through the above described key points, to build panoramic images of a structure starting from a plurality of scanned images taken from different directions.

DESCRIPTION OF A PREFERRED HARDWARE

In applications where a few images must be filtered, the algorithm according to the invention can be implemented efficiently through a common computer. In much heavier applications, such as filtering in real time video signals, the class of filters can be loaded by a dedicated hardware as that described in this example.

The apparatus is a device capable of implementing the whole class of filters according to the present invention. It can analyze in real time a continuous flow of images with resolution and frame-rate typical of a common video standard. Both the input video signal and the output signal are in digital format. For example, they can be a succession of 8 bit whole numbers representing 256 grey levels images. If the size of the images is 512×512 pixels and there are 25 photograms per second, then the pixels frequency, i.e. the data rate, is $f_p$=512×512×25=6.5536 MHz.

The apparatus can be described by a HDL language (Hardware Description Language), which defines univocally its architecture and allows its implementation on a circuit board. The choice of the device on which to map the architecture depends, instead, on production reasons. To achieve flexibility and rapidity of development of the product it is possible use programmable logic devices, such as FPGA (Field Programmable Gate Array) and CPLD (Complex Programmable Logic Device). If, vice versa, the performances and the final cost of the device are more relevant, an ASIC integrated circuit (Application-Specific Integrated Circuit) can be used. In both cases, external memory units may be necessary, for temporary data storing.

Figure 8:
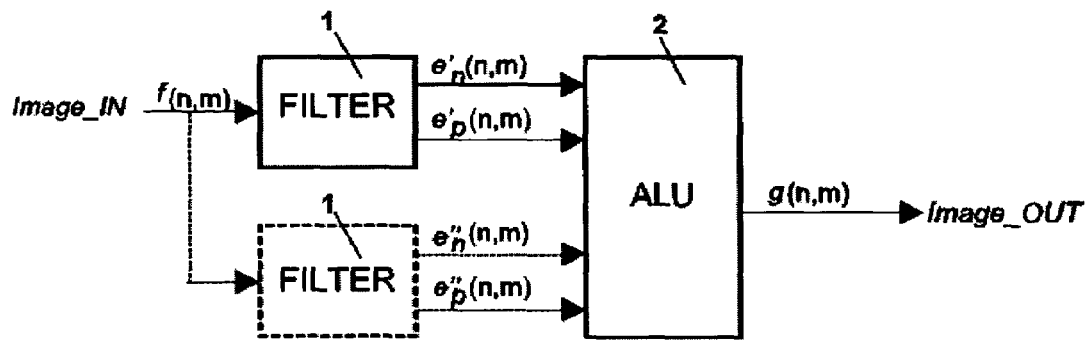
FIG. 8 shows a block diagram of an apparatus for implementation of the proposed class of filters capable of analyzing video signals in real time.

The architecture of the apparatus, shown in FIG. 8, consists of one or more filters 1 and of an ALU 2 (Arithmetic Logic Unit). The filters compute the positive deviation $e_p(n,m)$ and the negative deviation $e_n(n,m)$. Each filter is characterized by a predetermined set of parameters consisting of weight coefficients $w_1(k,l)$ $w_2(k,l)$ $w_3(k,l)$ $w_4(k,l)$. Such coefficients can be chosen in phase of start up of the system. Typically, the bit number necessary for the weight functions is the same as the bit number necessary for showing the image. The ALU carries out arithmetic and logic operations on results from previous filters, according to a chosen filtering operation.

The minimum configuration of the apparatus provides a single filter, and the ALU carries out only one operation between positive deviation and negative deviation. In the case, for example, where local maxima are sought at the discontinuity, the ALU carries out a difference operation between the two deviations.

$$g(n,m)=e(n,m)=e_p(n,m)-e_n(n,m) \quad (14)$$

From the sum of the two deviations:

$$g(n,m)=e_p(n,m)+e_n(n,m) \quad (15)$$

are obtained, instead, zero-crossings at the discontinuities.

In a more general case there are two filters, the ALU has input components obtained both from the first filter $e'_p(n,m)$ $e'_n(n,m)$ and from the second filter $e''_p(n,m)$ $e''_n(n,m)$. This configuration can be used, for example, for operations of local thresholding. The operation carried out by the ALU is the following:

$$\begin{cases} e'(n,m) = e'_p(n,m) - e'_n(n,m) \\ e''(n,m) = e''_p(n,m) - e''_n(n,m) \end{cases} \quad (16)$$

$$g(n,m) = \begin{cases} e'(n,m) & se\ e'(n,m) > e''(n,m) \\ 0 & se\ e'(n,m) \leq e''(n,m) \end{cases} \quad (17)$$

Figure 9:
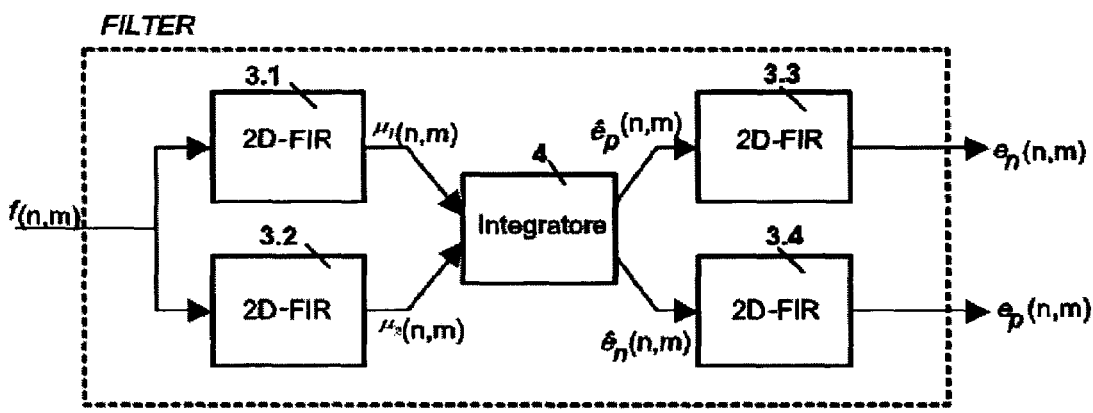
FIG. 9 shows the block diagram of the filters of FIG. 8.

The architecture of filter 1, shown in FIG. 9, has four FIR bidimensional convolutors and an integrator. The four convolutors implement the convolutions (2) of the image f(n,m) with masks $w_1(k,l)$ $w_2(k,l)$ and two convolutions (7) of the signals $\hat{e}_p(n,m)$ and $\hat{e}_n(n,m)$ with mask $w_4(k,l)$.

The integrator implements the sums of eq. (7) and given hereafter:

$$\hat{e}_p(n,m) = \sum_{(k,l)\in\Theta_{3p}} (\mu_1(n,m) - \mu_2(n-k, m-l))w_3(k,l) \quad (18)$$

$$\hat{e}_n(n,m) = \sum_{(k,l)\in\Theta_{3n}} (\mu_1(n,m) - \mu_2(n-k, m-l))w_3(k,l)$$

If 256 grey levels images are treated, it is possible to represent all the signals f(n,m), $_1$(n,m), $_2$(n,m), $\hat{e}_p$(n,m), $\hat{e}_n$(n,m), $e_p$(n,m), $e_n$(n,m), by means of 8 bit whole numbers. This approximation is a good bargain between precision of the result and complexity of the hardware.

Figure 10:
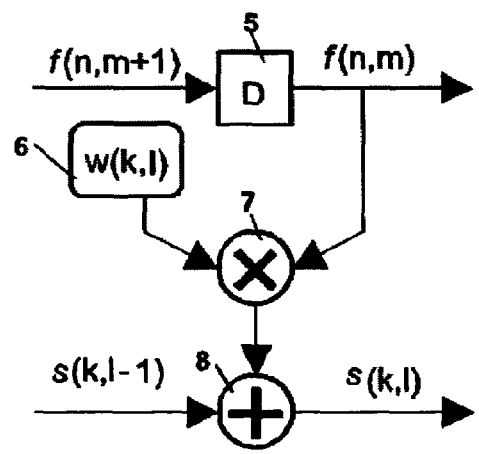
In FIG. 10 an architecture is diagrammatically shown of the elementary unit of four convolutors "2D-FIR" of FIG. 9.

The convolutors, whose block diagram is shown in FIG. 10, have a certain number of elementary units. The operation carried out by each unit is a multiplication-and-sum, that is:

multiplication between element f(n,m) of the image and coefficient w(k,l) of the convolution mask.

sum s(k,l) between the result of the multiplication and the value s(k,l−1) obtained by the previous unit.

Each unit consists of the following elements:

a delay unit 5.

a register 6 where the coefficient of the convolution mask is recorded.

a multiplicator 7.

an adder 8.

If 256 grey levels images are treated, elements 5 and 6 are implemented by means of 8 bit registers. Both multiplicator 7 and adder 8 are instead implemented using a combinatorial logic. The former has 8 bit inputs and 16 bit outputs, whereas the size of the latter depends on the size of the partial sum s(k,l−1). In some implementations, it can be advantageous to provide multiplicator and adder on a single combinatorial network having three inputs and an output.

If the computing rate of the unit is the same as the pixel frequency, it is possible to provide a multiplication-and-sum for each clock cycle. This means that for a convolution in real time it is necessary to use a same number of units as the size of the convolution mask of w(k,l). However, if quick semiconductor devices are used, it is possible to remarkably reduce the size of the convolutor and then the complexity of the integrated circuit that implements it. For example, where the computing rate of the unit is N times the pixel frequency, it is possible to use a same unit for carrying out multiplication-and-sum of the image and N values of the convolution mask w(k,l), which are loaded cyclically in register 6. This way, the size of the convolutor is reduced by a factor N.

By a bidimensional convolutor a convolution can be implemented with an desired weight function $w_i$(k,l) defined in a circular domain $\Theta_i$. However in case particular functions are used, for example Gaussian curves, another procedure can be used for reducing the size of the convolutor.

If weight functions $_i$(k,l) are used defined on a square domain:

$$i=\{(k,l)\in I^2: -r_i \leq k \leq r_i; -r_i \leq l \leq r_i\} \quad (19)$$

From the comparison with eq. (3) the square domain includes the circular domain: $\Theta_i \subseteq i$. If the numerical values of function $_i$(k,l) outside the intersection between the two domains can be neglected, the convolution with $w_i$(k,l) and the convolution with $_i$(k,l) are equivalent.

If, furthermore, function $_i$(k,l) is separable, i.e. it is possible to define two functions $_{i1}$(k) and $_{i2}$(l) such that:

$$\hat{w}_i(k,l) = \hat{w}_{i1}(k) \cdot \hat{w}_{i2}(l) \quad (20)$$

Then the bidimensional convolution with $_i$(k,l) is equivalent to a series of two monodimensional convolutions with $_{i1}$(k) and $_{i2}$(l) respectively. In the case, for example, of computing a mean value of function f(n,m), eq. (2) becomes:

$$\mu_i(n,m) = \sum_{(k,l)\in\hat{\Theta}_i} f(n-k, m-l)\hat{w}_i(k,l) \quad (21)$$

$$= \sum_{l\in\Phi_{i2}} \left(\sum_{k\in\Phi_{i1}} f(n-k, m-l)w_{i1}(k)\right) w_{i2}(l)$$

where $_{i1}$(k) and $_{i2}$(l) are defined in monodimensional domains:

$$\Phi_{i1} = \{k\in I: -r_{i1} \leq k \leq r_{i1}\}$$

$$\Phi_{i2} = \{l\in I: -r_{i2} \leq l \leq r_{i2}\} \quad (22)$$

Figure 11:
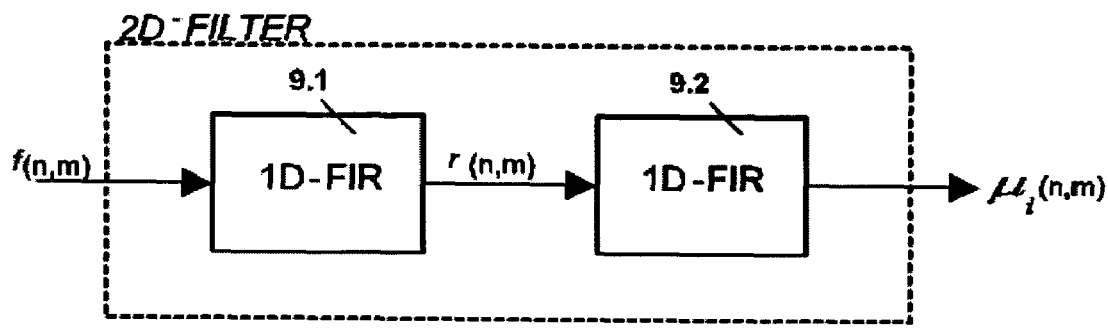
FIG. 11 shows an implementation of a bidimensional filter "2D-FIR" from a cascade of two monodimensional filters "1D-FIR"

With these hypotheses, the bidimensional convolutor can be implemented by a cascade of two monodimensional convolutors, as shown in FIG. 11. In case of 8 bit data, the dimension of the elements of the elementary unit of the first convolutor 9.1 is the same as described previously. The output data r(n,m) from the first convolutor are, instead, represented by a higher bit number: 16+Log $_2$(2·$r_{i1}$+1). However, in most cases, it is possible to approximate this data by a 8 bit whole number. With this further approximation, also the size of the elements of the elementary unit of the second convolutor 9.2 remains unchanged.

When turning from a bidimensional convolution on a square domain to two monodimensional convolutions, the number of single units necessary to the operation is reduced from $(2r_i+1)^2$ to $2(2r_i+1)$. In case of circular domains, the number of single units is normally less than $(2r_i+1)^2$, since $\Theta_i \subseteq \hat{\Theta}i$. However, the advantage deriving from the passage to monodimensional convolutions is still remarkable.

Figure 12:
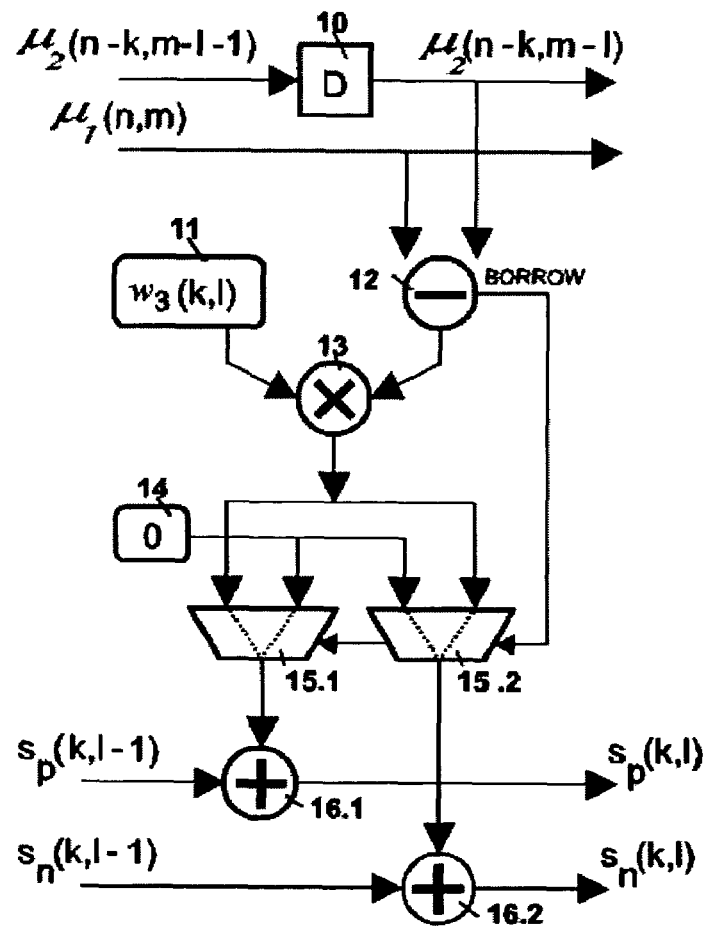
in FIG. 12 shown an architecture is diagrammatically of an elementary unit of the integrator of FIG. 9.

The integrator has units whose architecture is shown in FIG. 12. With reference to equations (18), the operations implemented by each unit are the following:

subtraction between $_1$(n,m) and $_2$(n−k,m−l )

multiplication with the coefficient of matrix $w_3$(k,l)

if the result of the subtraction is positive: it sums the value $s_p$(k,l) coming from the result of the multiplication and the value $s_p$(k,l−1) obtained by the previous unit.

If the result of the subtraction is negative: it sums the value $s_n$(k,l) of the result of the multiplication and the value $s_n$(k,l−1) obtained by the previous unit.

The elements of each elementary unit are the following:

a delay unit 10.

a register 11 where the coefficient of the convolution mask is recorded.

a subtractor 12 with "carry" (borrow).

a multiplicator 13.

a zero constant 14.

two multiplexer elements 15.1 and 15.2.

two adders 16.1 and 16.2.

If 256 grey levels are treated, elements 10 and 11 are implemented by means of 8 bit registers. All the other elements, numbered from 12 to 16.x, are instead implemented by combinatorial logic. The subtraction 12 is between 8 bit factors with 8 bit results, whereas the multiplication 13 is between 8 bit factors 16 bit results. The size of multiplexer 15.x and of adders 16.x depends on the size of the partial sums $s_p(k,l-1)$ and $s_n(k,l-1)$.

If the computing speed of the unit is the same as the pixel frequency, the integrator has $M^2$ units, where M is the size of the mask $w_3(k,l)$. As already discussed for convolutors, with a quick semiconductor device it is possible to use a same unit for calculating N elements of the sum. This way also the size of the integrator is reduced by a factor N.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A method for automatically detecting and tracking the contour of a starting image, said starting image being formed by an array of pixels and each pixel having an intensity, being n and m coordinates of a generic pixel, comprising the steps of:
   filtering said starting image through an absolute central moment e(n,m) of the intensity of the pixels of said starting image, wherein said absolute central moment is obtained with the following steps:
   determining for each n,m a local mean calculated on a neighborhood about a pixel of coordinates n,m of the starting image, obtaining a first filtered image;
   determining for each n,m a sum of absolute differences between the intensity of the pixel having coordinates n,m of the first filtered image and the intensity of all the pixels contained in a neighborhood about said pixel of coordinates n,m of either said starting image or a second filtered image derived from said starting image, wherein said sum of absolute differences is split calculating a sum of positive differences, or positive deviation, and a sum of negative differences, or negative deviation.

2. Method according to claim 1, wherein said sum of absolute differences is calculated computing the differences between said first filtered image and said second filtered image, wherein said second filtered image is obtained for each n,m from a local mean calculated on a neighborhood about the pixel of coordinates n,m of said starting image.

3. Method according to claim 1, wherein said absolute central moment e(n,m) is calculated in a generalized way as follows:

$$e(n, m) = w_4(n, m) \otimes \sum\sum_{(k,l) \in \Theta_3} |\mu_1(n, m) - \mu_2(n - k, m - l)| w_3(k, l) \quad (1)$$

where:
n,m are the coordinates of a pixel of a map f(n,m) of said image;
$w_1(n,m)$, $w_2(n,m)$, $w_3(n,m)$ and $w_4(n,m)$ are four weight functions defined on four circular domains $\Theta_1$, $\Theta_2$, $\Theta_3$ and $\Theta_4$, each point of said domains having coordinates (k,l), said circular domains $\Theta_1$, $\Theta_2$, $\Theta_3$ and $\Theta_4$ having respectively radius $r_1$, $r_2$, $r_3$ and $r_4$ and being defined as $$\Theta_i = \{(k,l) \in I^2 : \sqrt{k^2 + l^2} \leq r_i\}$$

$\otimes$ is a convolution operator;

$$\mu_1(n, m) = \sum\sum_{(k,l) \in \Theta_1} f(n, m) w_1(n, m)$$

is a mean value on domain $\Theta_1$ of said map and of said first filtered image;

$$\mu_2(n, m) = \sum\sum_{(k,l) \in \Theta_2} f(n - k, m - l) w_2(k, l)$$

the mean value on domain $\Theta_2$ of said map and of said second filtered image.

4. Method according to claim 3, wherein, starting from said absolute central moment e(n,m) calculated in said generalized way, said positive deviation $e_p(n,m)$ and said negative deviation $e_n(n,m)$ are used as further filters, defined as $$e_p(n, m) = w_4(n, m) \otimes \sum\sum_{(k,l) \in \Theta_{3p}} (\mu_1(n, m) - \mu_2(n - k, m - l)) w_3(k, l) \quad (7)$$

$$e_n(n, m) = w_4(n, m) \otimes \sum\sum_{(k,l) \in \Theta_{3n}} (\mu_1(n, m) - \mu_2(n - k, m - l)) w_3(k, l)$$

where domains $\Theta_{3p}$ and $\Theta_{3n}$ are defined as:

$$\Theta_{3p} = \{(k,l) \in \Theta_3 : \mu_1(n,m) > \mu_2(n-k,m-l)\}$$

$$\Theta_{3n} = \{(k,l) \in \Theta_3 : \mu_1(n,m) < \mu_2(n-k,m-l)\} \quad (8).$$

5. Method according to claim 4, wherein said step of computing the absolute central moment of the intensity of a pixel comprises the steps of:
   defining said circular domains $\Theta_1$, $\Theta_2$, $\Theta_3$ and $\Theta_4$, in a neighborhood about each point of the starting image, wherein $\Theta_1$, $\Theta_3$ and $\Theta_4$ are centered on n,m and $\Theta_2$ is a domain centered respectively on each point inside $\Theta_3$;
   associating to each domain $\Theta_i$, with i comprised between 1 and 4, a weight function $w_i$ and computing a mean value $\mu_i$ of a grey levels map for domains $\Theta_1$ and $\Theta_2$ on the basis of said $w_i$;
   computing the absolute central moment e(n,m) on the basis of a weight function $w_3$ on domain $\Theta_3$;
   splitting the absolute central moment e(n,m) into a positive deviation $e_p(n,m)$ and a negative deviation $e_n(n,m)$, thus creating near a discontinuity two partially overlapping bell-shaped profiles;
   convoluting said positive deviation $e_p(n,m)$ and said negative deviation $e_n(n,m)$ with weight function $w_4$ on domain $\Theta_4$;
   measuring said discontinuity using said positive deviation $e_p(n,m)$ and negative deviation $e_n(n,m)$ as filters.

6. Method according to claim 5, wherein said step of measuring discontinuity is carried out by tracking of a function $$\text{Min}(e_p(n,m), |e_n(n,m)|).$$

7. Method according to claim 6, wherein said step of measuring discontinuity is carried out through a subtraction defined as:

$$e(n,m) = e_p(n,m) - e_n(n,m).$$

8. Method according to claim 6, wherein a DoG filter (difference of Gaussian curves) is obtained using a sum of said positive $e_p(n,m)$ and negative $e_n(n,m)$ deviations of the absolute central moment $e(n,m)$.

9. Method according to claim 1, wherein said starting images are selected from the group of biomedical imaging techniques consisting of:

ultrasonic pulses, PET, SPECT, CAT, MR, among which anatomical images, or images of function, obtained by means of time sequences of anatomical views of a particular zone of an organ, or perfusion images, obtained on the same organ after treatment of the patient with substances that enhance the perfusion in the organ; images of graphs acquired by a scanner in order to convert paper graphs into digital signals.

10. Method according to claim 9 wherein, in case of images of graphs, scanned images are filtered with said absolute central moment $e(n,m)$ tracking it as a bell-shaped profile whose peak is the sought digital signal, a further step being provided of computing the digital signal with a local maxima detection algorithm of standard type.

11. Method for contour tracking, according to claim 3, characterized in that at a discontinuity said absolute central moment $e(n,m)$ calculated in said generalized way as $$e'(n,m) = \sum\sum_{(k,l)\in\Theta_3} |\mu_1(n,m) - f(n-k, m-l)| w_3(k,l) \quad (12)$$

is compared with a threshold value derived from said generalized absolute central moment, calculated as $$e''(n,m) = w_4(n,m) \otimes \sum\sum_{(k,l)\in\Theta_3} |f(n,m) - f(n-k, m-l)| w_3(k,l). \quad (13)$$

12. Apparatus for contour tracking in video images arranged as succession of photograms, comprising:

an arithmetic logic unit, one or several filters that calculate a positive deviation $e_p(n,m)$ and a negative deviation $e_n(n,m)$ of an absolute generalized central moment $e(n,m)$ a calculating means residing in said arithmetic unit for obtaining said absolute generalized central moment $e(n,m)$, wherein said calculating means:

determines for each n,m a local mean calculated on a neighborhood about a pixel of coordinates n,m of the starting image, obtaining a first filtered image;

determines for each n,m a sum of absolute differences between the intensity of the pixel having coordinates n,m of the first filtered image and the intensity of all the pixels contained in a neighborhood about said pixel of coordinates n,m of either said starting image or a second filtered image derived from said starting image, splits said sum of absolute differences calculating a sum of positive differences, or positive deviation, and a sum of negative differences, or negative deviation.

13. Apparatus according to claim 12, wherein said positive deviation $e_p(n,m)$ and said negative deviation $e_n(n,m)$ are defined as:

$$e_p(n,m) = w_4(n,m) \otimes \sum\sum_{(k,l)\in\Theta_{3p}} (\mu_1(n,m) - \mu_2(n-k, m-l)) w_3(k,l) \quad (7)$$

$$e_n(n,m) = w_4(n,m) \otimes \sum\sum_{(k,l)\in\Theta_{3n}} (\mu_1(n,m) - \mu_2(n-k, m-l)) w_3(k,l)$$

where domains $\Theta_{3p}$ and $\Theta_{3n}$ are defined as:

$$\Theta_{3p} = \{(k,l) \in \Theta_3 : \mu_1(n,m) > \mu_2(n-k,m-l)\}$$

$$\Theta_{3n} = \{(k,l) \in \Theta_3 : \mu_1(n,m) < \mu_2(n-k,m-l)\} \quad (8).$$

14. Apparatus according to claim 12 wherein said filters consist of four bidimensional convolutors and an integrator.

15. Apparatus, according to claim 14, wherein each of said bidimensional convolutors is replaced by a cascade of two monodimensional convolutors.

* * * * *